United States Patent
Acharya et al.

(10) Patent No.: US 7,359,532 B2
(45) Date of Patent: Apr. 15, 2008

(54) FINGERPRINT MINUTIAE MATCHING USING SCORING TECHNIQUES

(75) Inventors: Tinku Acharya, Chandler, AZ (US); Bhargab B. Bhattacharya, Kolkata (IN); Arindam Biswas, Kolkata (IN); Partha Bhowmick, Kolkata (IN); Arijit Bishnu, Kolkata (IN); Sandip Das, Kolkata (IN); Malay K. Kundu, Kolkata (IN); Chivukula A. Murthy, Kolkata (IN); Subhas C. Nandy, Kolkata (IN)

(73) Assignee: Intel Corporation, Santa Clara, CA (US)

( * ) Notice: Subject to any disclaimer, the term of this patent is extended or adjusted under 35 U.S.C. 154(b) by 791 days.

(21) Appl. No.: 10/734,335

(22) Filed: Dec. 11, 2003

(65) Prior Publication Data

US 2005/0129293 A1 Jun. 16, 2005

(51) Int. Cl.
*G06K 9/00* (2006.01)
(52) U.S. Cl. .................................. 382/124; 382/125
(58) Field of Classification Search ............ 382/199, 382/124, 125
See application file for complete search history.

(56) References Cited

U.S. PATENT DOCUMENTS

| | | | |
|---|---|---|---|
| 4,790,564 A * | 12/1988 | Larcher et al. | 283/69 |
| 6,763,127 B1 * | 7/2004 | Lin et al. | 382/125 |
| 2002/0034319 A1 * | 3/2002 | Tumey et al. | 382/116 |
| 2003/0007671 A1 * | 1/2003 | Ailisto et al. | 382/124 |
| 2004/0199775 A1 * | 10/2004 | Ser et al. | 713/186 |

OTHER PUBLICATIONS

Jain et al., "Hiding Fingerprint Minutiae in Images", Proc. Of Third Workshop on Automatic Identification Advanced Technologies (Auto ID), Tarrytown, NY, Mar. 14-15, 2002, pp. 97-102.*

* cited by examiner

*Primary Examiner*—Jingge Wu
*Assistant Examiner*—Amara Abdi
(74) *Attorney, Agent, or Firm*—Blakely, Sokoloff, Taylor & Zafman LLP

(57) ABSTRACT

Disclosed is a method and apparatus to provide for fingerprint minutiae matching using scoring techniques. A plurality of minutiae in a fingerprint image is defined. A score associated with each minutia corresponding to the validity of each minutia is estimated. The fingerprint image is then matched against one or more sample fingerprint images utilizing a partial point set pattern matching (PSPM) algorithm.

15 Claims, 7 Drawing Sheets

| x | y | type | angle | score |
|---|---|---|---|---|
| 146 | 108 | BM | 302 | 2 |
| 345 | 210 | BM | 251 | 4 |
| 352 | 375 | BM | 111 | 5 |
| 263 | 407 | BM | 31 | 5 |
| 130 | 333 | BM | 340 | 6 |
| 261 | 220 | BM | 50 | 8 |
| 362 | 116 | BM | 46 | 9 |
| 357 | 248 | BM | 286 | 10 |
| 264 | 437 | BM | 211 | 15 |
| 50 | 196 | BM | 266 | 19 |
| 250 | 234 | BM | 243 | 34 |
| 433 | 124 | BM | 253 | 37 |
| 100 | 350 | BM | 223 | 39 |
| 183 | 53 | BM | 334 | 43 |
| 409 | 84 | BM | 251 | 45 |
| 187 | 88 | BM | 328 | 45 |
| 391 | 77 | BM | 245 | 47 |
| 409 | 206 | BM | 250 | 52 |
| 347 | 119 | BM | 224 | 53 |
| 152 | 358 | BM | 37 | 53 |
| 356 | 291 | BM | 291 | 53 |
| 406 | 144 | BM | 251 | 59 |
| 146 | 415 | BM | 29 | 59 |
| 425 | 164 | BM | 270 | 62 |
| 297 | 197 | BM | 43 | 70 |
| 173 | 432 | BM | 217 | 92 |
| 290 | 87 | BM | 19 | 94 |
| 115 | 55 | BM | 300 | 95 |
| 407 | 114 | BM | 254 | 96 |
| 317 | 282 | BM | 105 | 97 |
| 330 | 352 | BM | 255 | 99 |
| 101 | 361 | TM | 219 | 52 |
| 142 | 388 | TM | 15 | 55 |
| 82 | 400 | TM | 40 | 55 |
| 327 | 92 | TM | 27 | 95 |
| 115 | 450 | TM | 215 | 99 |

FIG. 7

| Number of Sample Sets, K | CPU time in μ sec. | | % Savings |
|---|---|---|---|
| | Standard Matching | PSPM | |
| 10 | 39,696,066 | 1,280,111 | 96.70 |
| 20 | 85,016,140 | 3,457,594 | 95.90 |
| 50 | 228,242,586 | 11,784,255 | 94.83 |
| 100 | 548,033,187 | 19,754,415 | 96.39 |
| 200 | 1075,977,761 | 39,255,959 | 96.35 |

FINGERPRINT MINUTIAE MATCHING USING SCORING TECHNIQUES

FIELD

Embodiments of the invention relate generally to classification and feature extraction, and more particularly, to fingerprint minutiae matching using scoring techniques.

DESCRIPTION OF RELATED ART

Feature extraction is a current area of research and development in digital image processing and computer vision, particularly in areas relating to feature-based pattern recognition. For example, many image recognition, image detection, and biometric applications have been previously developed based on various techniques for feature extraction and pattern recognition.

Feature extraction in fingerprint images has unique aspects compared to general-purpose image processing applications, at least in part due to its special topological characteristics. In particular, in a fingerprint image, there are certain curved contours called ridgelines. The ridgelines correspond to minute elevations on the skin of the finger. They either end abruptly or split into two other ridges. These points at which ridges end or split are unique characteristics of a fingerprint and are called "minutiae" or "Galton characteristics" according to its observer, Sir Francis Galton. Galton calculated that the probability of an exact resemblance of any two fingerprints with each other is as low as one in sixty-four billion.

Automatic Fingerprint Identification Systems (AFISs) are typically based on minutiae matching. Minutiae are the terminations and bifurcations of the ridgelines in a fingerprint image. Most of the prior approaches utilized in feature extraction of fingerprint images transform a fingerprint image (e.g. a gray-scale image) into a binary image based at least in part on the convolution of the image with a filter coupled with certain variants of thresholding. However, these approaches have several disadvantages, such as computational intensity and the inability to robustly address noisy images. Particularly, noise and contrast deficiency, caused by non-ideal conditions, such as, ink excessiveness or ink deficiency, can introduce false minutiae and/or hide valid minutiae.

BRIEF DESCRIPTION OF THE DRAWINGS

FIG. 7 is a table illustrating coordinates, classifications, angles, and scores of a reduced set of minutiae.

DETAILED DESCRIPTION

Figure 1:
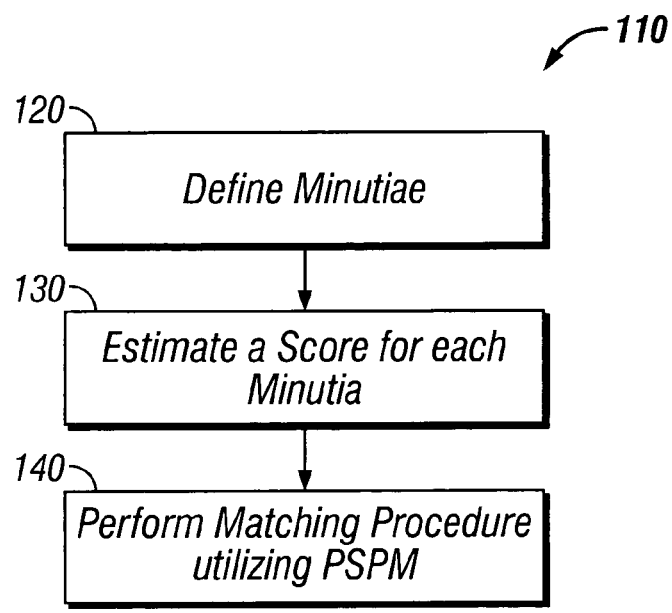
FIG. 1 is a flow diagram illustrating a process to implement fingerprint minutiae matching using scoring techniques, according to one embodiment of the present invention.

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention. Furthermore, embodiments of the invention will be described in particular embodiments but may be implemented in hardware, software, firmware, middleware, or a combination thereof.

In a fingerprint image, there are certain curved contours, referred to in this context as ridgelines. The ridgelines correspond to minute elevations on the skin of the finger. They either end abruptly or split into two or more ridges. The points at which ridges end or split are unique characteristics of a fingerprint and are called "minutiae" or "Galton characteristics", as previously discussed.

As is well known, by correlating minutiae sets, an expert or computer system may match fingerprints. Several Automatic Fingerprint Identification Systems (AFISs) utilize minutiae matching techniques. See, for example, J. Hollingum, Automated Fingerprint Analysis Offers Fast Verification, Sensor Review, vol. 12, no. 13, pp. 12-15, 1992; B. M. Mehtre and N. N. Murthy, A Minutiae Based Fingerprint Identification System, in Proceedings Second International Conference on Advances in Pattern Recognition and Digital Techniques, Calcutta 1986; F. Pernus, S.

Kovacic and L. Gyergyek, Minutiae-Based Fingerprint Recognition, in Proceedings Fifth International Conference on Pattern Recognition, pp. 1380-1382, 1980; J. H. Wegstein, An Automated Fingerprint Identification System, U.S. Government Publication, Washington, 1982. As proposed by the American National Standards Institute, see, for example, American National Standards Institute, Fingerprint Identification—Data Format for Information Interchange, New York, 1986, a minutiae may be classified into the following four classes depending at least in part on its location in the ridge topology: Termination, Bifurcation, Crossover, and Undetermined.

The model followed by the Federal Bureau of Investigation (FBI), see, for example, J. H. Wegstein, An Automated Fingerprint Identification System, U.S. Government Publication, Washington, 1982, adopted in most AFIS, is based on a two-class minutiae classification: termination and bifurcation. The embodiments described in more detail hereinafter apply the two-class model used by FBI, although, of course the claimed subject matter is not limited in scope in this respect. These embodiments are provided here merely as example applications.

An issue in automatic minutiae detection processes arises when the quality of a fingerprint image (e.g. a gray-scale image) is degraded. Noise and contrast deficiencies, attributable to non-ideal conditions, such as, ink excessiveness or ink deficiency, for example, may introduce false minutiae and/or hide valid minutiae, reducing the quality of the overall results of the process, as well as the speed of the process. Embodiments of the invention related to fingerprint minutiae matching using scoring techniques described hereinafter addresses such issues As has been described, automatic minutiae detection from gray-scale images and fast minutiae matching is a challenging task. Embodiments of the invention relate to a fast algorithm for partial point set pattern matching (PSPM) and its application to fingerprint minutiae matching. Not all minutiae in a fingerprint are of equal importance. Therefore, in order to characterize minutiae of higher significance, a method to assign scores (weights) to each minutia is provided. A minutia of higher significance correspondingly is assigned a higher score. Thereafter, a PSPM algorithm is used to find a weighted matching between, for example, a scored query fingerprint image and one or more scored sample fingerprint images.

Embodiments of the invention utilize the two-class model used by the FBI as a baseline. Further, for each minutiae, its membership class and corresponding co-ordinates with angles and scores is determined and stored in a fingerprint database. As is known, typically minutiae detection and matching becomes extremely difficult when the quality of a fingerprint image is poor. Particularly, noise and contrast deficiency, caused by non-ideal conditions, such as, ink excessiveness or ink deficiency, can introduce false minutiae and/or hide valid minutiae. However, false and/or hidden minutiae arising from noise is taken into account by a score value utilized in embodiments of the invention. For example, minutiae in a noisy zone of a fingerprint image are assigned lower scores compared to others. Thus, minutiae with higher scores are of more importance for matching.

Embodiments of the invention relate to a technique to assign scores to the minutiae extracted from a gray-scale fingerprint image. Further, a fast algorithm for partial point set pattern matching (PSPM) is disclosed. This technique for weighted minutiae comparison gives a better and more accurate matching of fingerprints.

Thus, embodiments of the present invention relate to fingerprint minutiae matching. Particularly, embodiments of the present invention relate to defining a plurality of minutiae in a fingerprint image and estimating and associating a score with each minutia corresponding to the validity of each minutia. The fingerprint image is then matched against one or more sample fingerprint images utilizing a partial point set pattern matching (PSPM) algorithm.

Turning now to FIG. 1, FIG. 1 is a flow diagram illustrating a process 110 to implement fingerprint minutiae matching using scoring techniques, according to one embodiment of the present invention. Process 110 broadly covers the operations performed to implement fingerprint minutiae matching. At block 120, a plurality of minutiae in a fingerprint image are defined. In one embodiment, the fingerprint image may be taken from a gray-scale fingerprint image. Next, a score for each minutia corresponding to the validity of each minutia is estimated and assigned to its respective minutia (block 130). After this, a matching procedure is performed utilizing a partial point set pattern matching (PSPM) algorithm. In this way, a scored fingerprint image and one or more scored sample fingerprint images can be compared and matched using the PSPM algorithm in an accurate and efficient process. The matching procedure utilizing the PSPM algorithm will be discussed in more detail below.

Figure 2:
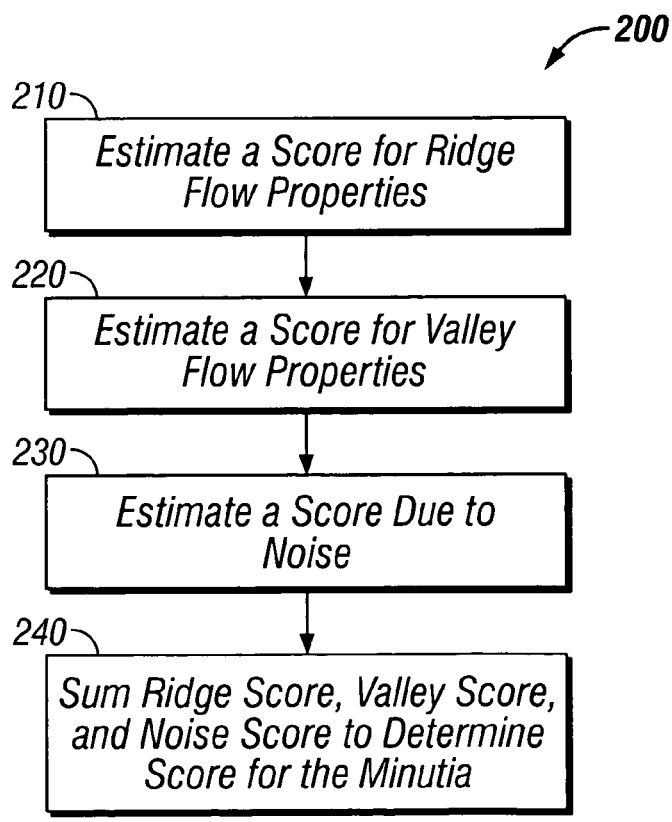
FIG. 2 is a flow diagram illustrating a broad overview of a process to estimate a score for a fingerprint minutiae point corresponding to the validity of the minutia, according to one embodiment of the present invention.

With reference now to FIG. 2, FIG. 2 is a flow diagram illustrating a broad-overview of a process 200 to estimate a score for a fingerprint minutia corresponding to the validity of the minutia, according to one embodiment of the present invention. Briefly, at block 210, a score for ridge flow properties for the minutia being considered is estimated. The score for the ridge flow properties corresponds to the smoothness of the ridgelines about the minutia. Next, a score for valley flow properties for the minutia being considered is estimated (block 220). The score for the valley flow properties corresponds to the smoothness of the valley lines about the minutia. Then, a score due to noise associated with the minutia being considered is estimated (block 230). The score due to noise corresponds to the amount of noise about a minutia in a pre-determined window about the minutia. Lastly, the process 200 sums the ridge score, the valley score, and the noise score for the minutia under consideration to determine a total score for the minutia (block 240). Each of these operations will be discussed in greater detail below.

A fingerprint image essentially consists of a set of minutiae on an x-y plane. In one embodiment of the present invention, a minutia P can be defined as a 5-tuple, P=<x, y, t, $\theta$, s>, where, (x, y)=co-ordinates of P, t=type of minutiae (a bifurcation minutiae or a termination minutiae), $\theta$=angle made by the tangent to the corresponding ridge at the point (x, y), and, s=score associated with the minutiae P. The model followed by the Federal Bureau of Investigation (FBI) (J. H. Wegstein, An Automated Fingerprint Identification System, US Government Publication, Washington, 1982), adopted in most AFIS, is based on a two-class minutiae classification: termination and bifurcation. In one embodiment of the present invention, the two-class model used by FBI, is utilized.

Particularly, for each minutia P, a score value s along with its membership class t, angle $\theta$ and corresponding co-ordinates are determined and stored. The score of a minutia indicates the level of authenticity of the minutia in the corresponding fingerprint image. A score for a minutia lies between 0 and 100, where a minutia with a score nearing 100 is of paramount significance compared to any other minutia with a lower score value. In other words, if a minutiae $P_1$ has a score $s_1$ and another minutia $P_2$ has a score $s_2$, where $s_1 < s_2$, then $P_1$ is a less dependable minutiae than $P_2$.

$\theta$ is defined as the angle at the minutia P made by the tangent to the corresponding ridgelines with respect to the positive x-axis and let $\lambda$ be defined as the average inter-ridge distance of the corresponding fingerprint image. Below is an example of an algorithm, according to one embodiment of the invention, that may be utilized to determine an angle $\theta$:

if (P="BM") /* bifurcation minutiae */
  detect the three ridges incident at P and name them as a, b, c;
  traverse along a, b, c separately starting from P by lengths of $l_a$, $l_b$, $l_c$ to reach $Q_a$, $Q_b$, $Q_c$;
    if ($l_a$ (or $l_b$ or $l_c$) encounters any bifurcation or termination), or,
    if ($l_a$ (or $l_b$ or $l_c$)=$\lambda$),
      traversal stops;
  if (more than one among $l_a$, $l_b$, $l_c$ are less than $\lambda/2$),
    P is not a minutiae;
  else
    evaluate and compare the three straight line distances $Q_aQ_b$, $Q_bQ_c$, $Q_cQ_a$;
    w.l.g., consider that $Q_bQ_c$ is minimum;
    if ($Q_bQ_c > 3\lambda/2$)
      P is not a minutiae;
    else
      rename a, b, c as r, $r_1$, $r_2$; /* r is pre-bifurcated ridge */
      rename $l_a$, $l_b$, $l_c$ as l, $l_1$, $l_2$; rename $Q_a$, $Q_b$, $Q_c$ as Q, $Q_1$, $Q_2$;
      /* Q lies on r and ridge segment length from P to Q=l*/
      evaluate $\theta$=angle of minutiae P=
        angle made by tangent to r at P w.r.t. (+) x-axis;
      return $\theta$;
else
if (P="TM") /* termination minutiae */
  detect the ridge r incident at P;
  traverse along r starting from P by a length of $\lambda$;
  evaluate $\theta$=angle of minutiae P=
    angle made by tangent to r at P w.r.t. (+) x-axis;
  return $\theta$;

The score s of a minutia P may be estimated based on the following properties: 1) pattern of ridge flow in and around P; 2) pattern of valley flow in and around P; and 3) noise level in the locality of P.

Figure 3:
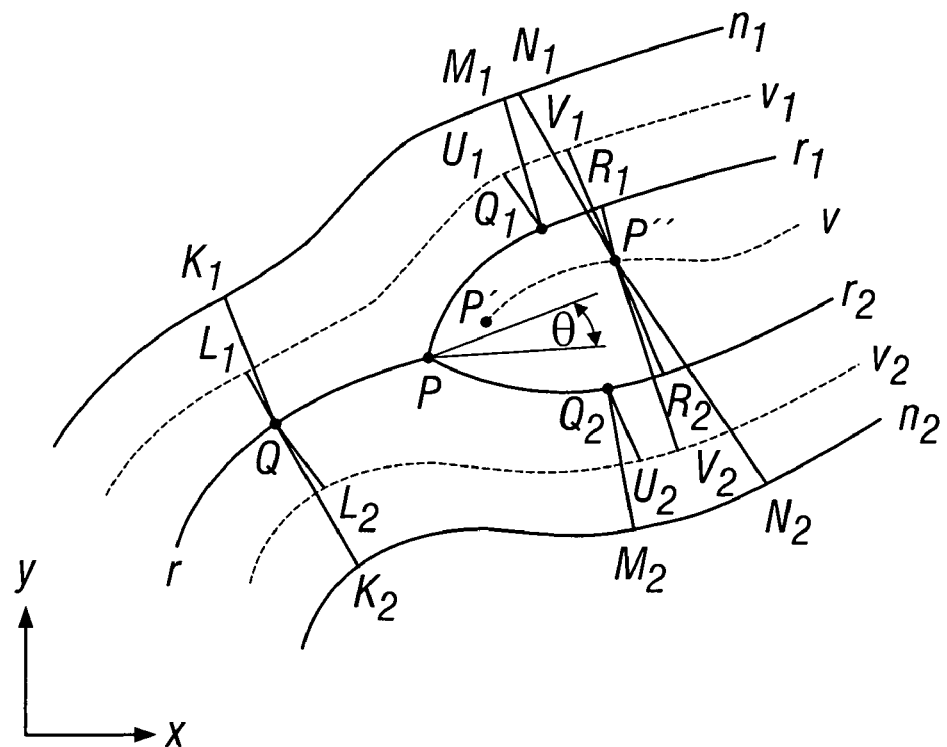
FIG. 3 is a simplified representation of a section of a fingerprint image showing ridges and valleys to aid in illustrating the process of estimating a score for a bifurcation minutia, according to one embodiment of the present invention.

With reference now to FIG. 3, an example of the determination of a minutiae score for a bifurcation minutia will now be presented. FIG. 3 is a simplified representation of a section of a fingerprint image showing ridges and valleys to aid in illustrating the process of estimating a score for a bifurcation minutia, according to one embodiment of the present invention.

It should be noted that if the ridgelines and valley lines in the local neighborhood of P have a smooth nature of flow, the corresponding minutia P will have a genuine contribution in the fingerprint matching and will have a high score. On the contrary, if in some region, the ridge and valley lines have a erratic or uneven nature of flow, any minutia P' in that region should not predominate the matching procedure of two fingerprint images and will correspondingly have a low score. The former minutia (P), being located in a tidy region, is more capable to participate in the matching procedure than the latter (P'), which is located in a clumsy and noisy region.

An illustrative example with reference to FIG. 3, will now be presented. Let P be a bifurcation minutia and its score, $s = s_r + s_v - s_n$, where, $s_r$=score due to ridge flow properties, $s_v$=score due to valley flow properties and $s_n$=negative score due to noise prevailing in the local region of P.

Let r be the ridge before bifurcation on which P lies and $r_1$, $r_2$ are the bifurcated ridges originated from P. Let $n_1$ and $n_2$ be the neighbor ridges of $r_1$ and $r_2$ respectively. Let P' be the termination minutiae of the valley line v which flows between the bifurcated ridgelines $r_1$ and $r_2$. Let $v_1$ be the valley line running between r and $n_1$, and $v_2$ the valley line between r and $n_2$.

Particularly, it can be seen that the points Q, $Q_1$ and $Q_2$ on the ridgelines r, $r_1$ and $r_2$, respectively, are each located at a distance of $\lambda$ (average inter-ridge distance of the corresponding fingerprint image) from P, measured along the corresponding ridgelines. In order to acquire these three points, the three ridges r, $r_1$ and $r_2$ are each traversed separately, starting from P. While traversing, if any branching from or termination of the respective ridge occurs, the traversal of the ridge is stopped and the process returns from that point along the corresponding ridge length traversed so far. Therefore, if any two of the three ridges has a traversed length $<\lambda/2$, the score of P is assigned as zero since the ridge flows are susceptible to abnormality.

If the distance between P and P' is less than $\lambda$, we find a point P''' on v such that PP'+ridge segment length P'P'''=$\lambda$ is found; otherwise, P''' is considered to be coinciding with P'.

After getting the four-control points Q, $Q_1$, $Q_2$ and P''', the corresponding tangents to the respective ridge/valley lines r, $r_1$, $r_2$ and v are evaluated, and the process finds the angles made by these tangents with (+) x-axis, namely, $\alpha_r$, $\alpha_1$, $\alpha_2$, $\alpha_v$ respectively. The angles $\alpha_r$, $\alpha_1$, $\alpha_2$, $\alpha_v$ are used to find the normals to corresponding ridge/valley lines and the angles made by these normals on (+) x-axis, namely, $\phi_r$, $\phi_1$, $\phi_2$, $\phi_v$. The angles $\phi_r$, $\phi_1$, $\phi_2$, $\phi_v$ lies in the range of (0°, 360°) and serves as the guiding directions to locate the nearest points of the neighboring ridge/valley lines in the subsequent steps of finding the scores of P as shown in the algorithm below.

Figure 4:
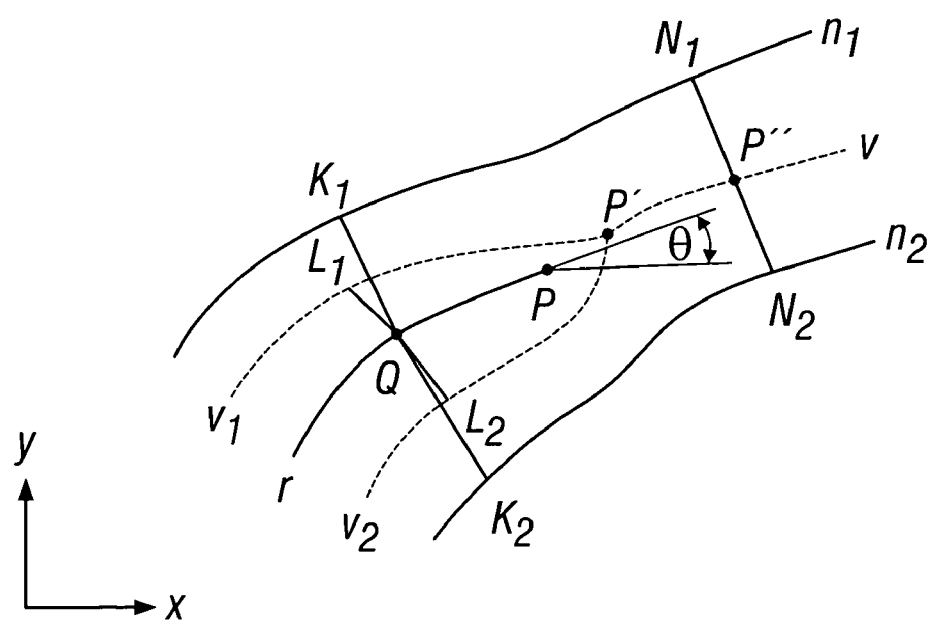
FIG. 4 is a simplified representation of a section of a fingerprint image showing ridges and valleys to aid in illustrating the process of estimating a score for a termination minutia, according to one embodiment of the present invention.

Below is an exemplary algorithm to find a score of a bifurcation minutia P, according to one embodiment of the present invention:

initialize: $s_r$=0, $s_v$=0, $s_n$=0;
detect the three ridges incident at P and name them as r, $r_1$, $r_2$,
  where, r is the pre-bifurcated ridge and
  $r_1$, $r_2$ are the two bifurcated ridges from r;
traverse along r, $r_1$, $r_2$ separately starting from P by lengths of l, $l_1$, $l_2$
  to reach Q, $Q_1$, $Q_2$;
  if ((l (or $l_1$ or $l_2$) encounters any bifurcation or termination), or,
    (l (or $l_1$ or $l_2$)=$\lambda$)),
      traversal stops;
search for a valley termination P' guided by the direction $\theta$ lying in between the bifurcated ridges $r_1$ and $r_2$;
if (straight line distance between P and P'=$\lambda$)
  make P'''=P';
else
  traverse along v starting from P' by a length of l'
  to reach P''' such that PP'+l'=$\lambda$;
evaluate $\alpha_r$=angle made by tangent to r at Q with respect to (w.r.t.) (+) x-axis;
evaluate $\alpha_1$=angle made by tangent to $r_1$ at $Q_1$ w.r.t. (+) x-axis;
evaluate $\alpha_2$=angle made by tangent to $r_2$ at $Q_2$ w.r.t. (+) x-axis;

evaluate $\alpha_v$=angle made by tangent to v at P" w.r.t. (+) x-axis;
evaluate $\phi_r$=angle made by normal to r at Q w.r.t. (+) x-axis;
evaluate $\phi_1$=angle made by normal to $r_1$ at $Q_1$ w.r.t. (+) x-axis;
evaluate $\phi_2$=angle made by normal to $r_2$ at $Q_2$ w.r.t. (+) x-axis;
evaluate $\phi_v$=angle made by normal to v at P" w.r.t. (+) x-axis;
evaluate $QK_1$=perpendicular distance of $n_1$ from Q with the guidance of $\phi_r$;
evaluate $QK_2$=perpendicular distance of $n_2$ from Q with the guidance of $\phi_r$;
evaluate $QL_1$=perpendicular distance of $v_1$ from Q with the guidance of $\phi_r$;
evaluate $QL_2$=perpendicular distance of $v_2$ from Q with the guidance of $\phi_r$;
evaluate $Q_1M_1$=perpendicular distance of $n_1$ from $Q_1$ with the guidance of $\phi_1$;
evaluate $Q_1U_1$=perpendicular distance of $v_1$ from $Q_1$ with the guidance of $\phi_1$;
evaluate $Q_2M_2$=perpendicular distance of $n_2$ from $Q_2$ with the guidance of $\phi_2$;
evaluate $Q_2U_2$=perpendicular distance of $v_2$ from $Q_2$ with the guidance of $\phi_2$;
evaluate $P"N_1$=perpendicular distance of $n_1$ from P" with the guidance of $\phi_v$;
evaluate $P"V_1$=perpendicular distance of $v_1$ from P" with the guidance of $\phi_v$;
evaluate $P"R_1$=perpendicular distance of $r_1$ from P" with the guidance of $\phi_v$;
evaluate $P"N_2$=perpendicular distance of $n_2$ from P" with the guidance of $\phi_v$;
evaluate $P"V_2$=perpendicular distance of $v_2$ from P" with the guidance of $\phi_v$;
evaluate $P"R_2$=perpendicular distance of $r_2$ from P" with the guidance of $\phi_v$;
compare $QK_1$ w.r.t. $\lambda$; update $s_r$;
compare $QK_2$ w.r.t. $\lambda$; update $s_r$;
compare $QL_1$ w.r.t. $\lambda/2$; update $s_v$;
compare $QL_2$ w.r.t. $\lambda/2$; update $s_v$;
compare $Q_1M_1$ w.r.t. $\lambda$; update $s_r$;
compare $Q_1U_1$ w.r.t. $\lambda/2$; update $s_v$;
compare $Q_2M_2$ w.r.t. $\lambda$; update $s_r$;
compare $Q_2U_2$ w.r.t. $\lambda/2$; update $s_v$;
compare $P"N_1$ w.r.t. $3\lambda/2$; update $s_r$;
compare $P"V_1$ w.r.t. $\lambda$; update $s_v$;
compare $P"R_1$ w.r.t. $\lambda/2$; update $s_r$;
compare $P"N_2$ w.r.t. $3\lambda/2$; update $s_r$;
compare $P"V_2$ w.r.t. $\lambda$; update $s_v$;
compare $P"R_2$ w.r.t. $\lambda/2$; update $s_r$;
evaluate $s_n$=score due to noise (if any) in the locality of P;

$$s=s_r+s_v-s_n;$$

normalize s in [0, 100] scale;
return s;

With reference now to FIG. 4, an example of the determination of a minutiae score for a termination minutia will now be presented. FIG. 4 is a simplified representation of a section of a fingerprint image showing ridges and valleys to aid in illustrating the process of estimating a score for a termination minutia, according to one embodiment of the present invention.

Let r be the ridge on which P lies and n1 and n2 be the two neighbor ridges of r. Let P' be the bifurcation minutiae of the valley line v which flows between adjacent ridgelines n1 and n2. Let v1 and v2 be the two valley lines bifurcated from v and incident at P'.

Particularly, it can be seen that point Q on the ridgeline r located at a distance of $\lambda$ from P can be measured along r. Note that such a point Q is always there in the skeletonized image for each termination minutia P; otherwise, r would have been eliminated as a spur in the pre-processing phase. If the straight distance between P and P' is less than $\lambda$, a point P" can be found on v such that PP'+ridge segment length P'P"=$\lambda$; otherwise, P" is considered to be coinciding with P'.

Next, the corresponding tangents at Q and P" to the ridgelines r and valley line v are respectively evaluated to find the angles made by these tangents w.r.t. (+) x-axis, namely, $\alpha_r$ and $\alpha_v$, respectively. The angles $\alpha_r$ and $\alpha_v$ are used to find the normals to corresponding ridge/valley lines and the angles $\phi_r$ and $\phi_v$ made by these normals w.r.t. (+) x-axis. The angles $\phi_r$ and $\phi_v$ lies in the range of (0 deg., 360 deg.) and serve as the guiding directions to locate the nearest points of the neighboring ridge/valley lines in the subsequent operations of finding the scores of P as shown in the algorithm below.

Figure 5:
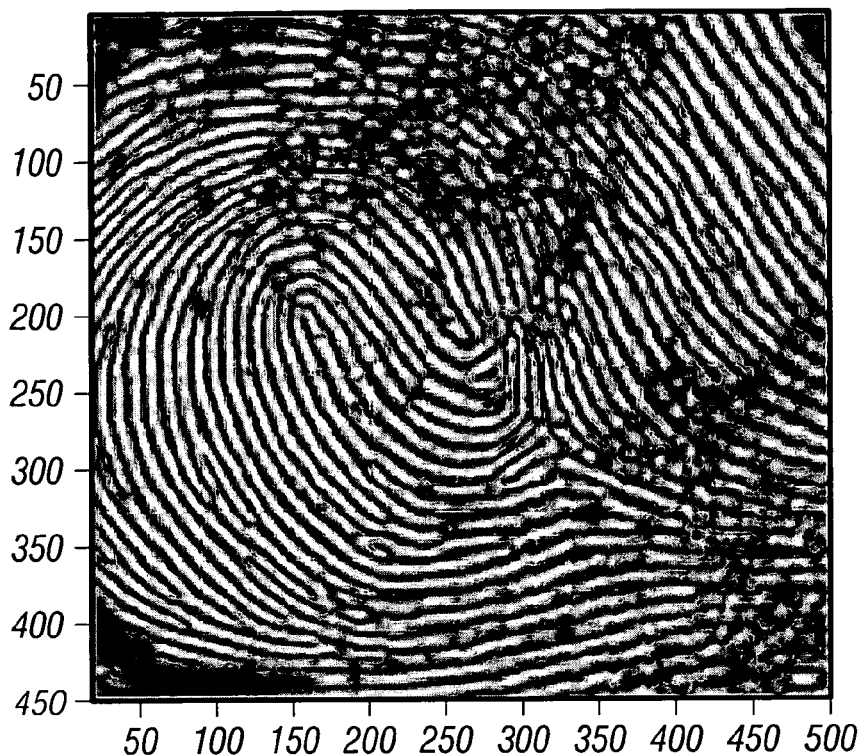
FIG. 5 is an exemplary gray-scale fingerprint image to which embodiments of the invention for fingerprint minutiae matching using scoring techniques is applied, for explanatory purposes.

Below is an exemplary algorithm to find a score of a termination minutia P, according to one embodiment of the present invention:
initialize: $s_r$=0, $s_v$=0, $s_n$=0;
traverse along r starting from P by a length of $\lambda$ to reach Q;
search for a valley bifurcation P' guided by the direction $\theta$ lying in between the neighbor ridges $n_1$ and $n_2$;
if (straight line distance between P and P'=$\lambda$)
    make P"=P';
else
    traverse along v starting from P' by a length l' to reach P" such that PP'+l'=$\lambda$;
evaluate $\alpha_r$=angle made by tangent to r at Q w.r.t. (+) x-axis;
evaluate $\alpha_v$=angle made by tangent to v at P" w.r.t. (+) x-axis;
evaluate $\phi_r$=angle made by normal to r at Q w.r.t. (+) x-axis;
evaluate $\phi_v$=angle made by normal to v at P" w.r.t. (+) x-axis;
evaluate $QK_1$=perpendicular distance of $n_1$ from Q with the guidance of $\phi_r$;
evaluate $QK_2$=perpendicular distance of $n_2$ from Q with the guidance of $\phi_r$;
evaluate $QL_1$=perpendicular distance of $v_1$ from Q with the guidance of $\phi_r$;
evaluate $QL_2$=perpendicular distance of $v_2$ from Q with the guidance of $\phi_r$;
evaluate $P"N_1$=perpendicular distance of $n_1$ from P" with the guidance of $\phi_v$;
evaluate $P"N_2$=perpendicular distance of $n_2$ from P" with the guidance of $\phi_v$;
compare $QK_1$ w.r.t. $\lambda$; update $s_r$;
compare $QK_2$ w.r.t. $\lambda$; update $s_r$;
compare $QL_1$ w.r.t. $\lambda/2$; update $s_v$;
compare $QL_2$ w.r.t. $\lambda/2$; update $s_v$;
compare $P"N_1$ w.r.t. $\lambda/2$; update $s_r$;
compare $P"N_2$ w.r.t. $\lambda/2$; update $s_r$;
evaluate $s_n$=score due to noise (if any) in the locality of P;

$$s=s_r+s_v-s_n;$$

normalize s in [0, 100] scale;
return s;

Further, below is an exemplary algorithm to find a noise score of minutia P, corresponding to the noise about the minutia, according to one embodiment of the present invention:
/* check the noise level in the a circular window centered at P and with radius $3\lambda/2$*/ initialize: $s_n$=0;

let win$[i_{min} \ldots i_{max}][j_{min} \ldots j_{max}]$ be a circular window s.t.$[(x-i)^2+(y-j)^2]^{1/2} \leq 3\lambda/2$, for all $i_{mi} \leq i \leq i_{max}$ and $j_{min} \leq j \leq j_{max}$;

let $n_r$=number of ridgelines non-minutiae bifurcations and terminations
  (due to spurs, bridges, loops, islands, or, erratic ridge flow)
  present within the window win;
let $n_v$=number of valley line bifurcations and terminations present within the window win;

if $(n_r+n_v > n_{thres})$ for each ridge/valley bifurcation and termination win$[i_k][j_k]$
    find the distance ($d_k$) of win$[i_k][j_k]$ from P;
    update $s_n$ accordingly depending on nearness of win $[i_k][j_k]$ from P;
return $s_n$;

FIG. 5 is an exemplary gray-scale fingerprint image 500 to which embodiments of the invention for fingerprint minutiae matching using scoring techniques is applied for explanatory purposes. More particularly, FIG. 5 shows an example of a gray-scale fingerprint image 500 of size 480×512 taken from the National Institute of Standards and Technology (NIST) special database 14.

Although the claimed subject matter should not limited in scope by the following example, an embodiment of the invention is described hereinafter that has been applied to fingerprint images obtained from the Special Database-14 of the National Institute of Standards and Technology (NIST), Gaithersburg, Md. 20899, USA. Utilizing embodiments of the invention for fingerprint matching using scoring techniques, the results in terms of processing time and quality of extraction have been found to provide advantages over alternative techniques. Likewise, this approach has been found to provide robust results in the presence of noisy images as well. For example, these techniques when applied to the noisy fingerprint image of FIG. 5, produce very robust results for identifying valid minutiae based on the previously-described scoring techniques, as will be discussed hereinafter.

Figure 6:
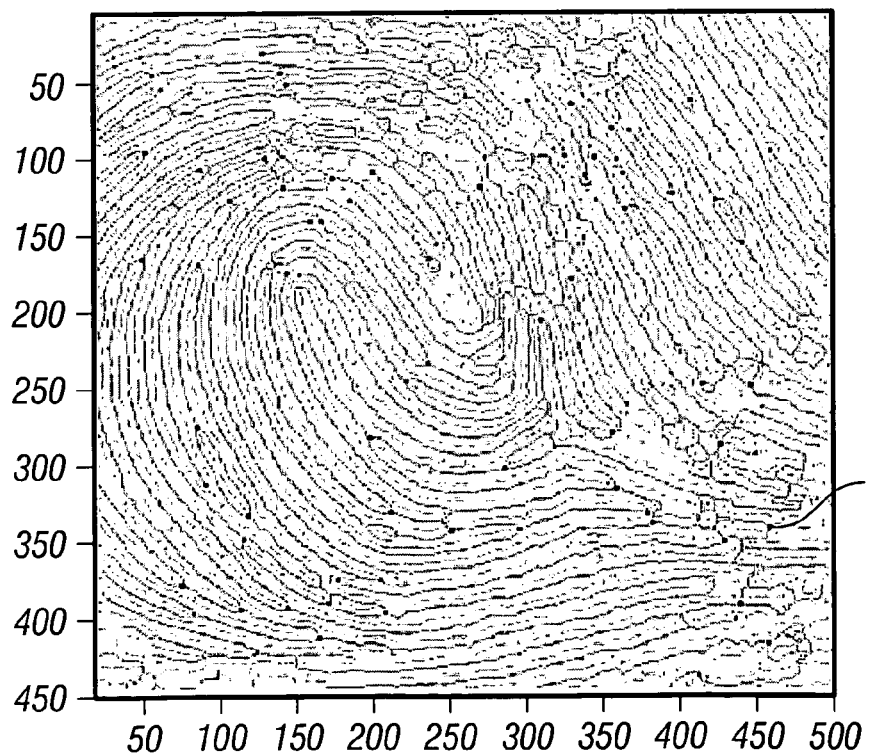
FIG. 6 is an example of a fingerprint image that has undergone pre-processing and that has had minutiae removed that do not belong to the classes of bifurcation or termination.

Turning now to FIG. 6, FIG. 6 is an example of a fingerprint image 600 that has undergone pre-processing and that has had minutiae removed that do not belong to the classes of bifurcation or termination. Thus, after pixel classification followed by thinning and other pre-processing phases, e.g., spur (isolated and ridge-connected) removal, detection of loops and bridges, and, removal of minutiae not belonging to the class of termination or bifurcation, a set of raw minutiae 610 remain, as shown in FIG. 6.

Next, this set of raw minutiae of FIG. 6 is passed through the previously-described procedures of score assignment and approximately 50% of them are eliminated as their scores are estimated to be zero or close thereto.

Looking to FIG. 7, FIG. 7 is a table illustrating coordinates (x, y), classifications (Bifurcation Minutiae (BM), Termination Minutiae (TM)), angles, and scores of the reduced set of minutiae that have survived the previously-described scoring process. As can be seen in the table of FIG. 7, in this example, only surviving minutiae that have scores greater than 0 are kept. As can be seen in the table, only 36 minutiae survived the scoring process with scores greater than 0.

It should be noted that in FIGS. 6, 8, 9, and 10 that the black lines represent ridgelines, whereas, gray lines (appearing dashed lines) correspond to the valley lines. For better visibility, the minutiae have been slightly enlarged in these figures. It should also be noted that the noisy regions in the skeletonized images have a higher density of bifurcations and terminations in the ridge and valley lines.

Figure 8:
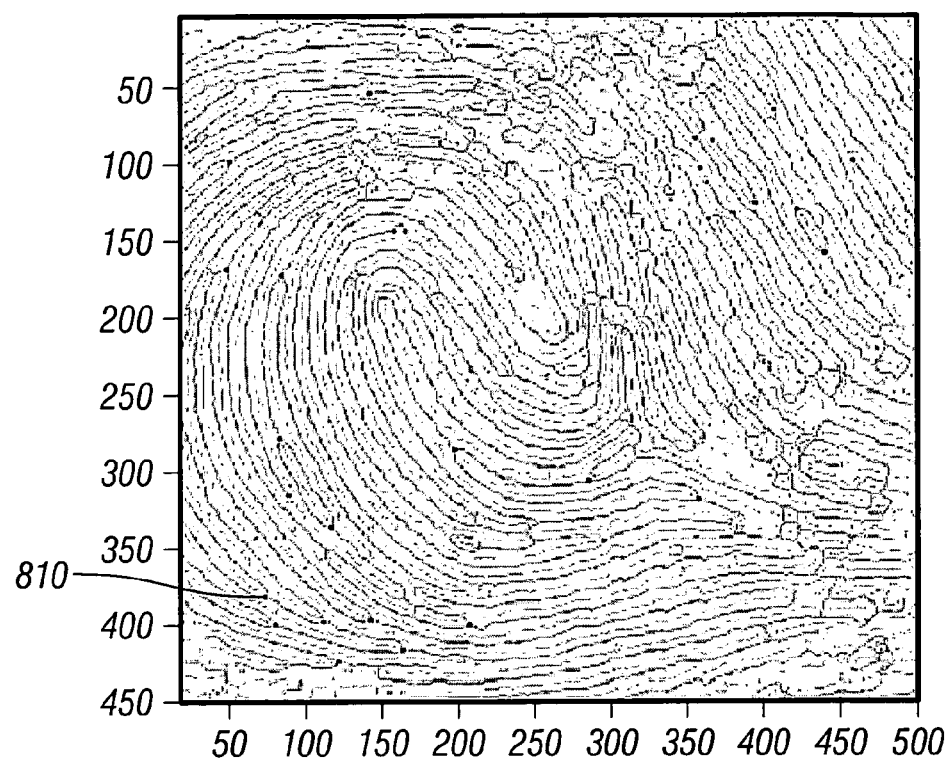
FIG. 8 is an example of a fingerprint image that has undergone scoring, in which only minutiae with a score greater than or equal to 1 are shown.

With reference now to FIG. 8, FIG. 8 is an example of a fingerprint image 800 that has undergone scoring, accordingly to embodiments of the invention as detailed in FIG. 7, and only minutiae 810 with a score greater than or equal to 1 remain and are shown in the fingerprint image 800. Visually it is quite evident that compared to the raw minutiae set, shown in FIG. 6, this set of 36 minutiae 810 with scores greater than or equal to 1 have a higher level of confidence, for use in matching, as will be described in detail below.

Figure 9:
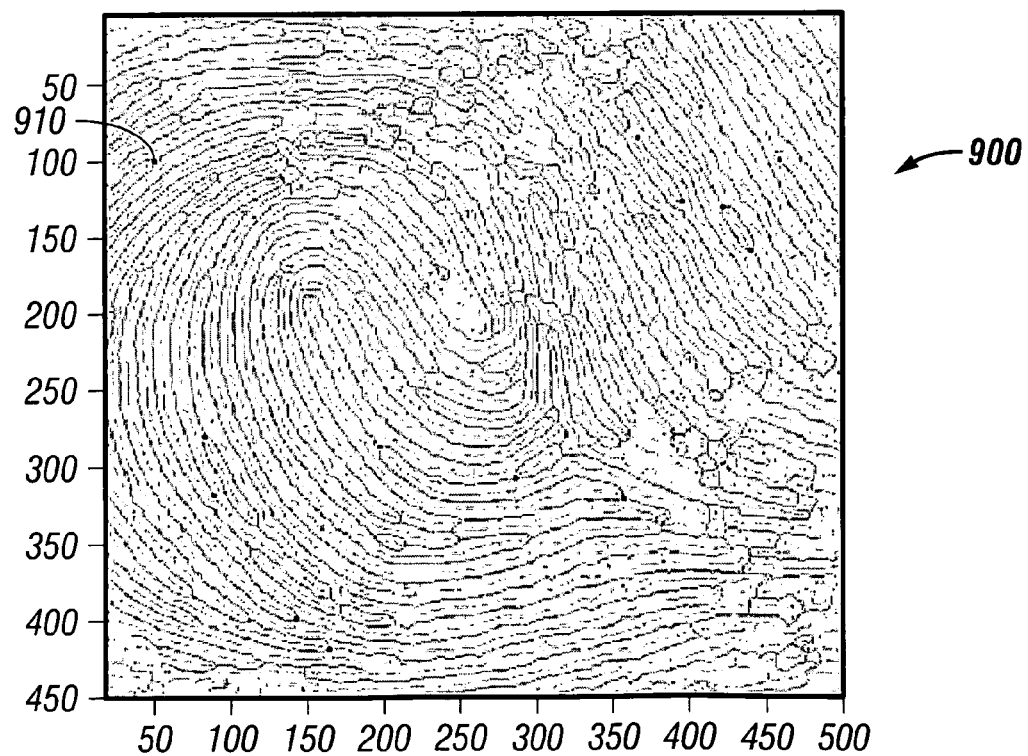
FIG. 9 is an example of a fingerprint image that has undergone scoring, in which only 10 bifurcation minutiae and 5 termination minutiae with the highest scores are shown.
Figures 10, 11:
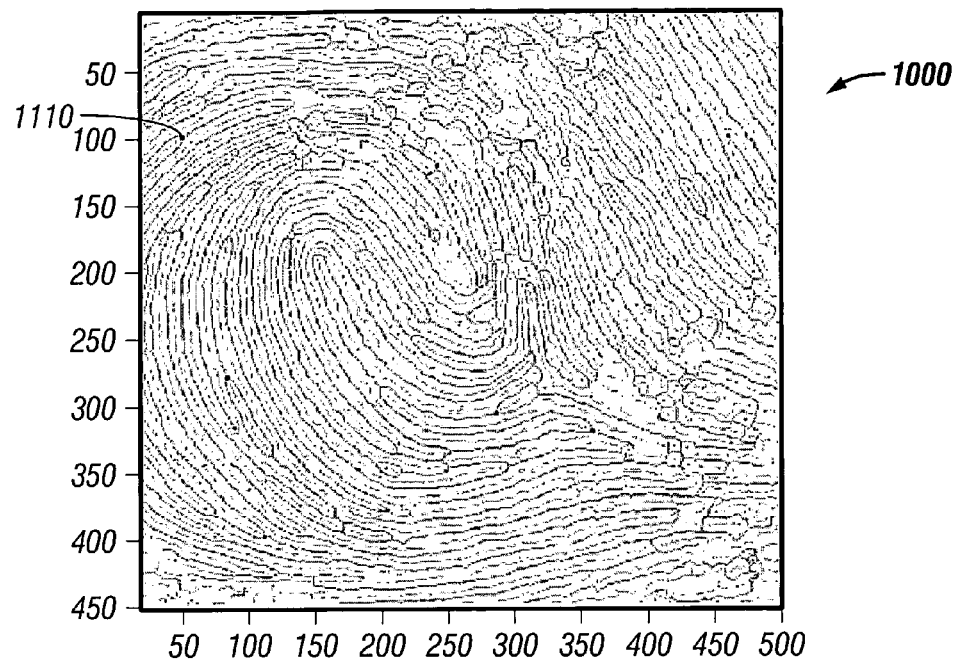
FIG. 10 is an example of a fingerprint image that has undergone scoring, in which only 5 bifurcation minutiae and 2 termination minutiae with the highest scores are shown.
FIG. 11 is a table illustrating the experimental performance of a standard matching algorithm versus the partial point set pattern matching (PSPM) algorithm utilizing reduced scored minutiae, according to embodiments of the present invention.

Further, with reference to FIGS. 9 and 10, FIG. 9 is an example of a fingerprint image 900 that has undergone scoring, in which only 10 bifurcation minutiae and 5 termination minutiae 910 with the highest scores are shown; whereas FIG. 10 is an example of a fingerprint image 1000 that has undergone scoring, in which only 5 bifurcation minutiae and 2 termination minutiae 1110 with the highest scores are shown.

FIGS. 9 and 10 illustrate fingerprint images that have undergone the previously-described scoring algorithm, and that include only the minutiae with the highest scores and these minutiae correspondingly have very high degrees of authenticity for use in matching, as will be described in detail below.

It should be noted that the evaluation of scores can be made more thorough and extensive if more attributes are considered, such as follows:
  (i) Closeness in the values of ridge segments $K_1N_1$ and $K_2N_2$ (in FIG. 3 & FIG. 4).
  (ii) Closeness in the values of ridge segments $K_1M_1$ and $K_2M_2$ (in FIG. 3).
  (iii) Closeness in the values of valley segments $L_1V_1$ and $L_2V_2$ (in FIG. 3).
  (iv) Closeness in the values of valley segments $L_1U_1$ and $L_2U_2$ (in FIG. 3).
  (v) Jaggedness of the ridgelines r, $r_1$, $r_2$, $n_1$, $n_2$, and valley lines v, $v_1$, $v_2$ by sum of square of distance estimation of the corresponding line segments from their approximate curve fittings (e.g. splines).

A matching procedure is provided as follows, according to one embodiment of the present invention. The set of minutiae with positive scores are sorted with respect to their scores in descending order. The set of minutiae $\{P_i|i=1, 2, \ldots, n;\ score(P_i) \geq score(P_{i+1})$ for $i=1, 2, \ldots, n-1\}$ are arranged in a heap-like structure such that the root (level 0) has $P_1$, the two nodes at level 1 have $P_2$ and $P_3$, the next level (level 2) nodes have $P_4$, $P_5$, $P_6$ and $P_7$, and so on.

While looking for a match of the query set Y with a sample or pattern set X, a match is first attempted at the top level (higher score values) minutiae of Y with the top level minutiae of X. If there is a match between the two top-scoring minutiae subsets of X and Y, the heap structure is searched down further to check for full-set matching between X and Y. This procedure expedites the matching course of action and is able to deliver the result of approximate matching in terms of score.

As previously discussed, in one embodiment, a two-dimensional PSPM matching algorithm to perform two-dimensional PSPM matching under translation and rotation is utilized to perform matching.

Thus, embodiments of the invention related to fingerprint minutiae matching using scoring techniques, after a plurality of minutiae in a fingerprint image are initially defined, first implements the previously-described techniques to score each minutia in a fingerprint image. For example, the fingerprint image may be taken from a gray-scale fingerprint image. The score of each minutia is estimated and assigned to the minutia. The score of each minutia corresponds to the validity or authenticity of the minutia taking into account such things as ridge flow properties, valley flow properties, and noise.

After this, many of the non-scoring or low scoring minutiae are removed from consideration. For example, pre-determined score criteria may be pre-defined. After scoring, the remaining higher scoring minutiae having a greater degree of validity may be utilized in a matching algorithm, such as, in one embodiment, a partial point set pattern matching (PSPM) algorithm. In this way, a scored query fingerprint image and one or more sample fingerprint images can be compared and matched using the PSPM algorithm in an accurate and efficient process. This PSPM algorithm will now be discussed in more detail.

It should be noted that one of the basic problems associated with fingerprint matching is the following: given two objects A and B, determine how much they resemble each other under different transformations. One method to solve this problem is by use of the partial point set pattern matching (PSPM) algorithm.

The problem addressed by partial point set pattern matching can be stated as follows. To start, let A be the larger set of points (called sample set) and B, a small set of points (called pattern or query set). The problem is to find whether B has a match in A, i.e. whether a subset of A exists which matches B. In one dimension, the problem is solved using the following procedure: the points are sorted with respect to their coordinates and a sequence of distances is found among the pair of consecutive members. The same thing is done for the pattern point set B also. Then, a string matching is performed to detect a match. Using this idea, Lee and Rezende (P. J. Rezende, and D. T. Lee, Point Set Pattern Matching in d-dimensions, Algorithmica, vol. 13, pp. 387-404, 1995 (hereinafter Lee and Rezende)) previously showed that given a set B of k points and a set A of n>k points in the d-dimensional Euclidian space, whether a k-subset of A matches B under translation, rotation and scaling can be found in $O(k.n^d)$ time. $O(k.n^d)$ is a conventional term in algorithms that represents the asymptotic upper bound in terms of k, n, d.

Embodiments of the invention relate to a 2-D partial point set pattern matching problem under translation and rotation only. The PSPM algorithm set forth supports subset matching, that is, the number of points in a pattern set may be less than or equal to the number of points in the sample set.

In actual applications related to fingerprint matching, there are a number of sample sets. The algorithm set forth pre-processes these sample sets such that, given an arbitrary pattern set, it tries to find the sample sets such that a subset of points in each of these sample sets match with the points in the given query pattern set, if they exist.

An example of pre-processing is provided as follows. Suppose m sample sets, namely $S_1, S_2, \ldots, S_m$. Data structures for each set are prepared separately which will be used for matching with a query pattern set. Below the pre-processing of one set of points is described.

Figure 12A:
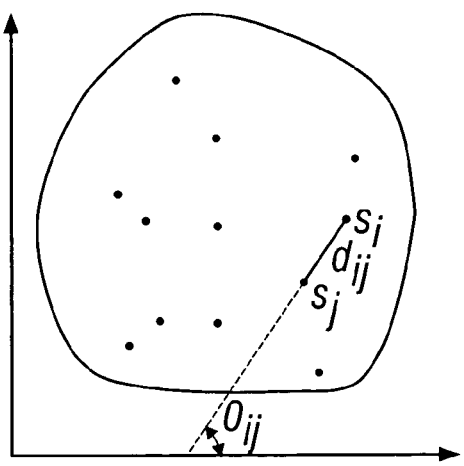
FIG. 12 is an example of a primary_structure and a secondary_structure.
Figure 12B:
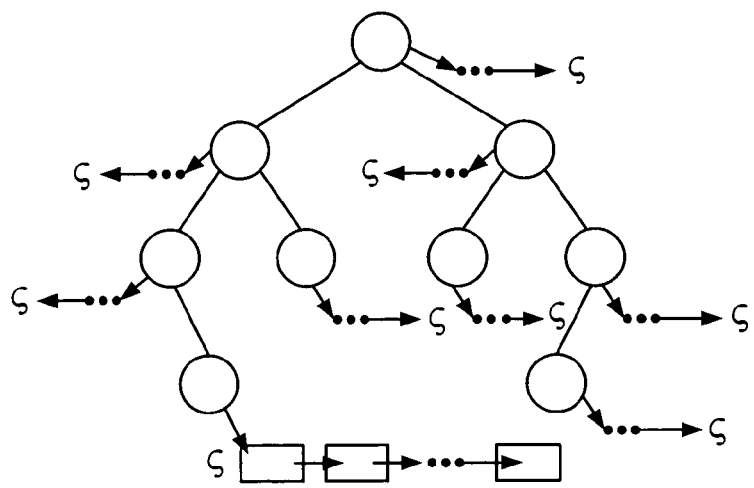
Figure 12C:
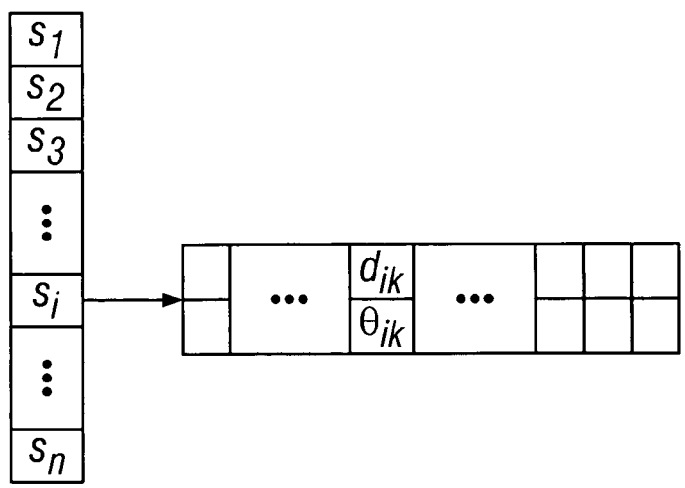

Suppose that the set $S_i$ has n points inside a rectangular box. Each point is arbitrarily labeled. The distances of all $_nC_2$ pairs of points are determined and stored in a height balanced binary search tree. This is referred to as the primary_structure. The nodes of this tree correspond to the distinct distances among the members in the point set. Each node is attached with a pointer to an array, called same_d-istance_ptr. The elements in the array correspond to all the pairs of points having distance equal to d. Each element of this array contains (i) identification of the pair of points contributing to this distance, and (ii) angle of the line joining these points with the x-axis. Apart from the primary_structure, another data structure, called secondary_structure, is created for each element of $S_i$. It is an array of size n−1, and its members correspond to the points in $S_i$\s sorted with respect to their distances from s. The primary_structure and the secondary_structure have been shown in FIG. 12.

For example the following algorithm may be used in order to effectuate this pre-processing:

Operation P1: Label the points in $S_i$ as $s_1, s_2, \ldots, s_n$, in an arbitrary manner.

Operation P2: Process the members in $S_i$ one by one.
Let $s_i$ be the current point under processing.
Compute $d_{ij}$=distance $(s_i, s_j)$ and $\theta_{ij}$=angle of the line $(s_i, s_j)$ with the x-axis, for all j=i+1, . . . , n.
Create a new record with $\theta_{ij}$, and the identifiers of the points $s_i, s_j$.
Find $d_{ij}$ in the primary_structure,
If $d_{ij}$ is already present, then insert the new record in the array attached to the node corresponding to $d_{ij}$;
Otherwise, create a new node in the primary_structure corresponding to $d_{ij}$.
Its attached array will contain the new record as a single element.
Insert $d_{ij}$ and its attached information in the secondary_structure of both $s_i$ and $s_j$.

Operation P3: Finally, sort the members of the secondary_structure of each point with respect to the angle field.

Further, query processing is also performed. For example, given a pattern point set P of size k, each sample set is considered separately. For each sample set $S_i$, the objective is to find a subset of points that match with the points in P under translation and/or rotation. The exemplary query algorithm is performed as follows:

Algorithm (* for matching $S_i$ with P*)

Operation Q1: Label its points as $p_1, p_2, \ldots, p_k$.

Operation Q2: Next, pick up any two points (say with labels $p_1$ and $p_2$ randomly from the pattern set, and compute distance $\delta$ among them.

Operation Q3: Search the primary_structure with $\delta$.
If $\delta$ is not present, then declare $S_i$ does not match with P;
Otherwise, (* we need to perform a detailed study inside the sample set $S_i$*)
Let the labels of the two end points of the matched distance in the primary_structure of $S_i$ be $s_1$ and $s_2$. We anchor the line segment $p_1p_2$ of P with the line segment $s_1s_2$.
Search the secondary structure attached with $s_1$ ($s_2$) to inspect whether there exists a match. For each point $p_i \epsilon P$
compute the distance $d(p_1, p_i)$ and the angle $\angle p_1p_ip_2$.
Search the secondary structure of $s_1$ ($s_2$) with $d(p_1, p_i)$.
If a match is found, the corresponding angle is also checked.
If all the points in P are matched with k points of $S_i$, then report the name of the set i and the subset of the points of $S_i$, which matches, with the points in P.

The above-described two-dimensional PSPM algorithm can be used to match a query fingerprint image against one or more sample fingerprint images. Particularly, both the query fingerprint image and the sample fingerprint images, will have both previously undergone the previously-described fingerprint minutia scoring techniques such that both the query fingerprint image and the sample fingerprint images involved in the matching process are utilizing reduced, high-scoring (and therefore with greater validity) query and sample minutiae sets. This results in an accurate and quickly converging PSPM matching algorithm.

As previously discussed, many of the non-scoring or low scoring minutiae are removed from consideration from the query and sample fingerprint sets. For example, pre-determined score criteria may be pre-defined. After scoring, the remaining higher scoring minutiae having a greater degree of validity may be utilized in the PSPM matching algorithm such that the PSPM is very accurate and converges quickly. In this way, a scored query fingerprint image and one or more sample fingerprint images can be compared and matched using the PSPM algorithm in an accurate and efficient process.

Particularly, the above-described PSPM matching algorithm in conjunction with the scoring techniques, according to embodiments of the present invention, was tested against a standard fingerprint image matching algorithm for the same problem presented by Lee and Rezende on a SUN Work Station, Ultra-Enterprise, Sparc, Sun4u (the OS version being Solaris 5.6). FIG. 11 is a table illustrating the experimental performance of a standard matching algorithm utilizing reduced scored minutiae, versus the partial point set matching (PSPM) algorithm with scoring, on the problem presented by Lee and Rezende, according to embodiments of the present invention.

In this test, a number of sample sets (K) were generated, and in each sample set S, 30 to 40 points (which is approximately equal to the number of minutiae present in a typical fingerprint) were generated. Thereafter, a particular point set S, was related at random; a subset from that point set was taken and arbitrarily translated and rotated to form the pattern set P. Then a sub-set matching was performed where each of the K sample sets were checked for a possible match. After a match was obtained, the algorithm was stopped. It should be noted that, as the pattern set P was a sub-set of a particular sample set from the K number of sample sets, a match is always ensured. This is also a sure test of the correctness of the algorithm. The time reported is averaged over a number of experiments for different values of K.

As shown, in FIG. 11, compared with the standard matching algorithm, across a wide array of sample sets, the PSPM algorithm provided, on average, between approximately 94-96% savings in CPU (i.e. central processing unit) time.

It will, of course, be understood that, although particular embodiments have just been described, the claimed subject matter is not limited in scope to a particular embodiment or implementation. For example, one embodiment may be in hardware, whereas another embodiment may be in software. Likewise, an embodiment may be in firmware, or any combination of hardware, software, or firmware, for example. Likewise, although the claimed subject matter is not limited in scope in this respect, one embodiment may comprise an article, such as a storage medium. Such a storage medium, such as, for example, a CD-ROM, or a disk, may have stored thereon instructions, which when executed by a system, such as a computer system or platform, or a imaging system, for example, may result in an embodiment of a method in accordance with the claimed subject matter being executed, such as an embodiment of a method of fingerprint minutiae matching using scoring techniques, for example, as previously described. For example, an image processing platform or a fingerprint image processing system may include an integrated circuit, a processing unit, an input/output device and/or memory.

Further, while embodiments of the present invention and its various functional components have been described in particular embodiments, it should be appreciated that the embodiments of the present invention can be implemented in hardware, software, firmware, middleware or a combination thereof and utilized in systems, subsystems, components, or sub-components thereof.

When implemented in software or firmware, the elements of the present invention are the instructions/code segments to perform the necessary tasks. The program or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, bar codes, etc. The code segments may be downloaded via networks such as the Internet, Intranet, etc.

Additionally, while embodiments of the invention have been described with reference to illustrative embodiments, these descriptions are not intended to be construed in a limiting sense. Various modifications of the illustrative embodiments, as well as other embodiments of the invention, which are apparent to persons skilled in the art to which embodiments of the invention pertain, are deemed to lie within the spirit and scope of the invention.

What is claimed is:

1. A method comprising:
    defining a plurality of minutiae in a fingerprint image including data related to x, y coordinates and an angle for a minutia and data related to a classification of the minutia as a termination or bifurcation minutia;
    removing minutiae that are not classified as a termination or bifurcation minutia;
    estimating a score associated with a minutia corresponding to a validity of the minutia based upon ridge flow properties, valley flow properties, and noise associated with the minutia for the fingerprint image, wherein the score due to noise corresponds to the amount of noise about the minutia in a pre-determined window about the minutia, and the score is further estimated based upon whether the minutia is classified as a termination or bifurcation minutia; and
    matching the fingerprint image against one or more sample fingerprint images utilizing a two-dimensional partial point set pattern matching (PSPM) algorithm under translation and rotation utilizing the score.

2. The method of claim 1, wherein the definition of the minutia includes data related to the estimated score for the minutia.

3. The method of claim 1, wherein estimating the score associated with the minutia includes estimating the score for ridge flow properties associated with the minutia.

4. The method of claim 1, wherein estimating the score associated with the minutia includes estimating the score for valley flow properties associated with the minutia.

5. The method of claim 1, wherein estimating the score associated with the minutia includes determining the score by summing the score for ridge flow properties, valley flow properties, and noise associated with the minutia.

6. An apparatus comprising:
an integrated circuit; and
a processor included with the integrated circuit to implement operations including:
defining a plurality of minutiae in a fingerprint image including data related to x, y coordinates and an angle for a minutia and data related to a classification of the minutia as a termination or bifurcation minutia;
removing minutiae that are not classified as a termination or bifurcation minutia;
estimating a score associated with a minutia corresponding to a validity of the minutia based upon ridge flow properties, valley flow properties, and noise associated with the minutia for the fingerprint image, wherein the score due to noise corresponds to the amount of noise about the minutia in a pre-determined window about the minutia, and the score is further estimated based upon whether the minutia is classified as a termination or bifurcation minutia; and
matching the fingerprint image against one or more sample fingerprint images utilizing a two-dimensional partial point set pattern matching (PSPM) algorithm under translation and rotation utilizing the score.

7. The apparatus of claim 6, wherein the definition of the minutia includes data related to the estimated score for the minutia.

8. The apparatus of claim 6, wherein estimating the score associated with the minutia includes estimating the score for ridge flow properties associated with the minutia.

9. The apparatus of claim 6, wherein estimating the score associated with the minutia includes estimating the score for valley flow properties associated with the minutia.

10. The apparatus of claim 6, wherein estimating the score associated with the minutia includes determining the score by summing the score for ridge flow properties, valley flow properties, and noise associated with the minutia.

11. A machine-readable medium having stored thereon instructions, which when executed by a machine, cause the machine to perform the following operations comprising:
defining a plurality of minutiae in a fingerprint image including data related to x, y coordinates and an angle for a minutia and data related to a classification of the minutia as a termination or bifurcation minutia;
removing minutiae that are not classified as a termination or bifurcation minutia;
estimating a score associated with a minutia corresponding to a validity of the minutia based upon ridge flow properties, valley flow properties, and noise associated with the minutia for the fingerprint image, wherein the score due to noise corresponds to the amount of noise about the minutia in a pre-determined window about the minutia, and the score is further estimated based upon whether the minutia is classified as a termination or bifurcation minutia; and
matching the fingerprint image against one or more sample fingerprint images utilizing a two-dimensional partial point set pattern matching (PSPM) algorithm under translation and rotation utilizing the score.

12. The machine-readable medium of claim 11, wherein the definition of the minutia includes data related to the estimated score for the minutia.

13. The machine-readable medium of claim 11, wherein estimating the score associated with the minutia includes estimating the score for ridge flow properties associated with the minutia.

14. The machine-readable medium of claim 11, wherein estimating the score associated with the minutia includes estimating a score for valley flow properties associated with the minutia.

15. The machine-readable medium of claim 11, wherein estimating the score associated with the minutia includes determining the score by summing the score for ridge flow properties, valley flow properties, and noise associated with the minutia.

* * * * *